Figure 1:
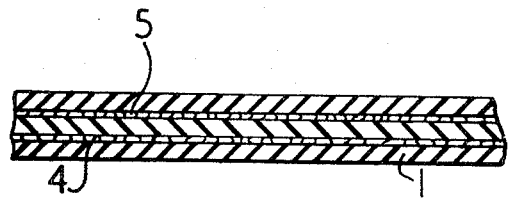

United States Patent [19]
Lawson

[11] 3,783,704
[45] Jan. 8, 1974

[54] POWER TRANSMISSION, CONVEYOR AND VEHICLE TRACK

[75] Inventor: Neil Lawson, Glamorgan, Wales
[73] Assignee: Dunlop Limited, London, England
[22] Filed: Mar. 8, 1972
[21] Appl. No.: 232,854

[30] Foreign Application Priority Data
    Mar. 11, 1971  Great Britain ................. 06,637/71

[52] U.S. Cl. ............................................. 74/231 J
[51] Int. Cl. ............................................. F16g 1/00
[58] Field of Search ...................... 74/231 R, 231 P, 74/231 J

[56] References Cited
FOREIGN PATENTS OR APPLICATIONS
1,179,061  10/1964  Germany ........................... 74/231 P
913,305    9/1946   France ............................. 74/231 R Primary Examiner—Leonard H. Gerin
Attorney—Richard K. Stevens et al.

[57] ABSTRACT

A belt having a joint with abutting ends both above and below the neutral axis of longitudinal bending of the belt, and a flexible jointing ply located between the abutting ends and lying along the neutral axis to reinforce the joint, the flexible jointing ply being of a strength sufficient to withstand substantially the same tensile load as that which the uncut belt is capable of withstanding.

16 Claims, 6 Drawing Figures

PATENTED JAN 8 1974

3,783,704

SHEET 1 OF 2

PATENTED JAN 8 1974

3,783,704

SHEET 2 OF 2

POWER TRANSMISSION, CONVEYOR AND VEHICLE TRACK

This invention relates to power transmission, conveyor and vehicle track belts and to methods of manufacturing joints in such belts.

There are already known many different types of belt joints and methods of manufacturing them. These include lap joints, butt joints, hinged or plated joints and stepped joints.

While joints of these known types can be effective in regard to their tensile strength under a direct steady pull, they tend to fail under the action of repeated bending or under cyclically variable tensile loads.

In particular, increase or decrease of the bending modulus, from one transverse section, at or near the joint, to another, causes concentration of the bending stresses at the point of modulus change since it becomes a "hinge point" and failure of the belt can rapidly ensue.

As regards failure under the action of cyclically variable tensile belt loads, these loads are concentrated, and thus the stress is increased at points where the tensile modulus changes and a resulting fatigue failure can ensue if, at any belt section, the tensile modulus is below the modulus of the belt at points along the belt spaced apart from the region of the joint.

It is an object of the present invention at least to reduce the advent of belt failure at or near to a belt joint compared with the previously-mentioned known joints.

According to one aspect of the present invention there is provided a belt having a joint with abutting ends both above and below the neutral axis of longitudinal bending of the belt and a flexible jointing ply located between the said abutting ends and lying along said neutral axis to reinforce the joint, said ply being of a strength sufficient to withstand substantially the same tensile load as that which the uncut belt is capable of withstanding.

According to another aspect of the present invention the abutting ends of the joint are linear.

According to a further aspect of the present invention the abutting ends of the joint are non-linear, so that the line of the joint cannot lie in the plane containing the axis of bending of the belt.

In this instance, in particular, the non-linear ends can be of zig-zag or undulating configuration viewed in plan.

Particularly in instances where the abutting ends of the joint are linear, the ends should be inclined to the longitudinal edges of the belt and not disposed at right angles thereto; i.e., so that the line of the joint does not lie in the plane containing the axis of bending of the belt.

Where the abutting ends are inclined, the inclination of one pair of abutting ends of the joint may be different from that of another such pair.

The belt may be of elastomeric material and may have one or more reinforcing plies. One or more plies may be arranged above or below the jointing ply and neutral axis and they may be of woven or unwoven textile material, or steel material.

In another arrangement, the abutting ends above or below the jointing ply may be staggered or offset relative to one another longitudinally of the belt when viewed in plan. Two, three or more offsets may be incorporated at the joint dependent upon the convenient division, and the quantity, of longitudinal belt reinforcing plies.

The material of the jointing ply may be of woven or unwoven textile material, for example, synthetic or natural fibers or filaments, or of steel filaments, and the textile or steel material may be twisted in the form of cords.

According to another aspect of the present invention a method of joining belt ends comprises laminating each belt end along the neutral axis of bending of the belt associated with each end, inserting a jointing ply between the laminated ends to extend along the said neutral axis to span the ends, butting the ends together and adhering the laminated ends, jointing ply and abutting ends together.

Preferably, in the case of a rubber-based belt, the adhesion is by means of vulcanization and pressure, and in the case of a thermoplastic-based belt by means of heat and pressure.

According to a further aspect of the invention a method of joining belt ends comprises severing the ends of the belt in an inclined direction to the longitudinal direction of the belt when the ends are severed linearly, or in an inclined or right-angle direction when the ends are severed in a zig-zag or undulating direction, all as when viewed in plan, and all as described above in relation to the belt construction itself as opposed to the method of making it.

Figure 2:
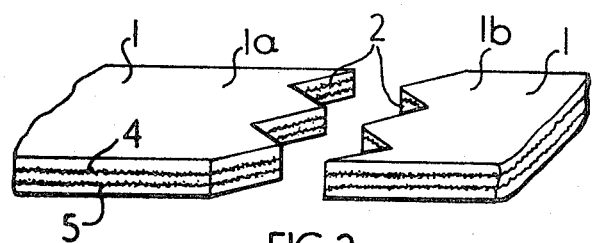
Figure 3:
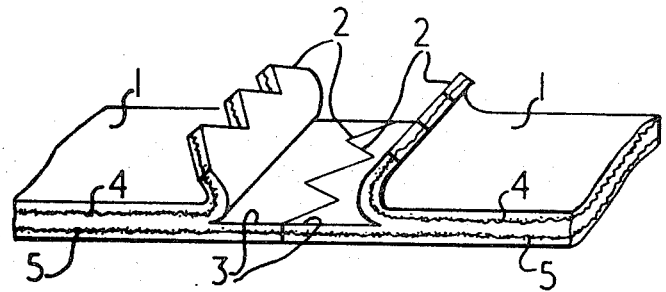
Figure 4:
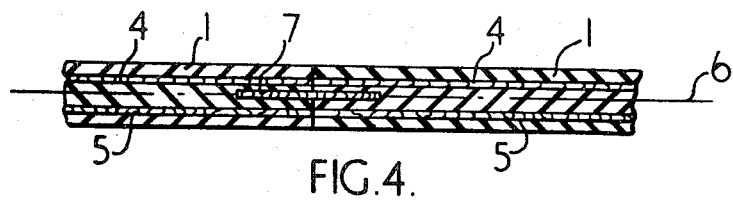
Figure 5:
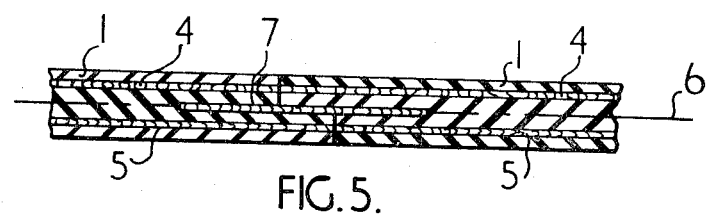
Figure 6:
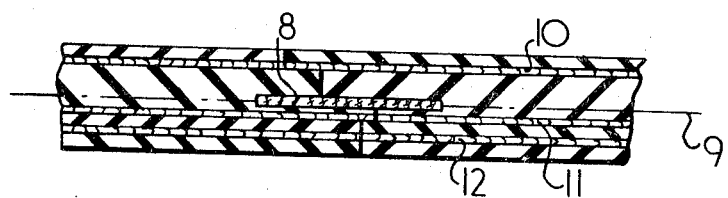

Embodiments of the invention will now be described, by way of example, with reference to the accompanying sheets of drawings in which:

FIG. 1 shows a portion of belt, in longitudinal cross-section, to be cut and joined, FIG. 2 shows in perspective a cut portion of the same belt, FIG. 3 shows in perspective, the belt of FIG. 2 partly joined, FIG. 4 shows, in longitudinal cross-section, the belt of FIG. 3 completely joined by the method of the present invention, FIG. 5 shows, in longitudinal cross-section, another belt joint formed in accordance with the present invention, and FIG. 6 shows, in longitudinal cross-section, another belt joined in accordance with the present invention.

In the construction shown in FIGS. 1 to 4, the two-ply belt 1, as illustrated in FIG. 1, is transversely severed, at the ends 1a and 1b to be jointed, so that, in plan view, a zig-zag cut 2 is made, one cut end fitting snugly into the other cut end as shown in FIG. 2.

In FIG. 3 there is illustrated a lamination of the ends of the belt, the lamination being caused by a longitudinal cut 3, parallel with the belt surface along the neutral axis 6 of the belt. In this construction the neutral axis is mid-way between the reinforcing plies 4 and 5.

A part of the laminated belt, at each end to be joined, is lifted up as shown in FIG. 3 and a rubberized textile cord jointing ply 7 of a strength substantially equal to that of the uncut belt is located to span the zig-zag cut 2 as shown in FIG. 4. The jointing ply is coated with a vulcanizable rubber solution as are also the surfaces of the belt which have been created by the laminating process.

The closed belt joined with the jointing ply sandwiched in position as shown in FIG. 4 is vulcanized to form a compact strong joint.

Fabric manufactured to the following specification is used for the plies of the two-ply belt illustrated in the drawings.

Counts & Plies: Polyester Warp: made up from three yarns plied together, the resultant Tex count, after doubling, being 388.

Nylon Weft: made up from two yarns plied together, the resultant Tex count, after doubling, being 188.

Threads per inch:
Warp:30
Weft:15
Weave:Plain
Breaking load
Warp: 1,180 lb/inch (ravelled
Weft:450 strip):

The jointing ply fabric would be woven to the following specification:

Counts & Plies:Polyester Warp: made up from six yarns plied together, the resultant Tex count, after doubling, being 675.

Nylon Weft: made up from four yarns plied together, the resultant Tex count, after doubling, being 382.

Threads per inch:
Warp:27
Weft:10.5
Weave:Oxford
Breaking load
Warp: 2,150 lb/inch (ravelled
Weft:650 strip):

It will be seen that the jointing ply fabric has approximately twice the tensile warp strength of the fabrics used in the body plies of the belt.

By virtue of this construction in which a zig-zag cut 2 is provided across the width of the belt there is an avoidance of a transverse hinge point at the cut.

By virtue of the provision of a jointing ply 7 located on the neutral axis 6 of the belt, at the joint, the bending of the belt such as would occur when passing over supporting or driving pulleys does not cause high stresses in the jointing ply. The additional strength at the joint, apart from that provided by the jointing ply, contributed by the vulcanization of the butting zig-zag cut belt ends, adds considerable strength to reduce the tendency of belt failure.

Moreover, by virtue of the fact that, in cross-section of the belt, there is provided a jointing ply having a tensile modulus at least equal to that conferred by the two reinforcing plies of the belt structure the danger of the concentration of high stress leading to fatigue failure is reduced.

Whereas, in the preceding embodiment, as will be seen with reference to FIG. 4, the joints in the upper laminated part and the lower laminated part lie one above another in the alternative construction shown in FIG. 5, they are offset one from another to form a staggered joint.

Although in the construction illustrated two-ply belts are shown, the invention is applicable to belts without reinforcing plies or with any number of reinforcing plies and one or more jointing plies may be utilized located substantially on the neutral axis between the laminated ends of a belt to be joined.

FIG. 6 illustrates a staggered joint formed in a three-ply belt of non-symmetrical construction. The reinforcing ply 8 is located in the plane of the neutral axis 9 between an upper reinforcement layer 10 and two lower reinforcement layers 11 and 12, and abutting ends both above and below the neutral axis are offset relative to each other.

In the case where there is already a ply at the neutral axis of bending this may be removed locally to make room for the reinforcing ply.

While in the embodiments described the belt is cut to form transverse slits in which the reinforcing ply is located, where it is required to use a reinforcing ply of substantial thickness and maintain a uniform belt thickness, the belt may be cut so as to form a pair of transverse grooves.

When the belt is utilized for a vehicle drive belt, e.g., for driving a vehicle to be used in snow conditions, the belt may be provided with transverse cleats or bars. The cleats or bars may be rivetted to the belt and where a zig-zag joint is provided the cleat or bar can be secured in a position so that the rivets pass through some or all of the toothed formations constituting the zig-zag joint.

Having now described my invention, what I claim is:

1. A belt having a joint comprising abutting ends both above and below the neutral axis of longitudinal bending of the belt, and a flexible jointing ply of a tensile strength sufficient to withstand substantially the same tensile load as that which the uncut belt is capable of withstanding, said flexible jointing ply being located between said abutting ends and lying along said neutral axis.

2. A belt according to claim 1 wherein the abutting ends above the neutral axis are staggered relative to the abutting ends below the neutral axis.

3. A belt according to claim 1 wherein the abutting ends are linear.

4. A belt according to claim 3 wherein the abutting ends are inclined relative to the longitudinal edges of the belt.

5. A belt according to claim 4 wherein the abutting ends above and below the neutral axis are inclined at different angles relative to the longitudinal edges of the belt.

6. A belt according to claim 1 wherein the abutting ends are of zig-zag configuration.

7. A belt according to claim 1 wherein the jointing ply is formed from textile material.

8. A belt according to claim 7 wherein the jointing ply is formed from vulcanization textile material.

9. A belt according to claim 1 wherein the jointing ply comprises steel filaments.

10. A belt according to claim 1 wherein one or more reinforcing plies are provided.

11. A method of joining belt ends comprising laminating each belt end along the neutral axis of bending of the belt, inserting a jointing ply between the laminated ends to extend along the said netural axis to spand the ends, butting the ends together and adhereing the laminated ends, jointing ply and abutting ends together.

12. A method according to claim 11 wherein each belt end is laminated by cutting to form a transverse slit.

13. A method according to claim 11 wherein each belt end is laminated by cutting to form a transverse groove.

14. A method according to claim 11 wherein the belt ends are rubber-based and are joined together by vulcanization.

15. A method according to claim 11 wherein the belt ends are thermoplastic-based and are joined together by the application of heat and pressure.

16. In a belt having at least two reinforcement layers with a longitudinally extending neutral axis therebetween and abutting ends on said reinforcement layers, a joint comprising a flexible jointing ply of a tensile strength sufficient to withstand substantially the same tensile load as the uncut belt, said flexible jointing ply being located along the neutral axis and longitudinally overlapping the abutting ends.

* * * * *